US012157330B2

(12) United States Patent
Pfeiffer et al.

(10) Patent No.: US 12,157,330 B2
(45) Date of Patent: Dec. 3, 2024

(54) # SECURITY ELEMENT WITH A MACHINE-READABLE CODE AND METHOD FOR PRODUCING THE SAME

(71) Applicant: Giesecke+Devrient Currency Technology GmbH, Munich (DE)

(72) Inventors: Matthias Pfeiffer, Munich (DE); Stefan Bichlmeier, Munich (DE); Christoph Mengel, Munich (DE); Andreas Holzmeister, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 0 days.

(21) Appl. No.: 18/469,864

(22) Filed: Sep. 19, 2023

(65) Prior Publication Data

US 2024/0092113 A1 Mar. 21, 2024

(30) Foreign Application Priority Data

Sep. 21, 2022 (DE) ......................... 102022003473.5

(51) Int. Cl.
*B42D 25/369* (2014.01)
*B42D 25/342* (2014.01)
(Continued)

(52) U.S. Cl.
CPC ......... *B42D 25/369* (2014.10); *B42D 25/342* (2014.10)

(58) Field of Classification Search
CPC .. B42D 25/369; B42D 25/342; B42D 25/355; B42D 25/425
(Continued)

(56) References Cited

U.S. PATENT DOCUMENTS 8,544,893 B2 10/2013 Schutzmann et al.
2009/0008922 A1 1/2009 Schutzmann et al.
(Continued)

FOREIGN PATENT DOCUMENTS

AT 510366 B1 12/2012
DE 102004049999 A1 4/2006
(Continued)

OTHER PUBLICATIONS

German Search Report from corresponding DE Application No. 102022003473.5, Apr. 28, 2023.

*Primary Examiner* — Justin V Lewis
(74) *Attorney, Agent, or Firm* — Workman Nydegger

(57) ABSTRACT

Proposed is a security element, preferably in the form of a security stripe, security thread, or a security patch, comprising a machine-readable code and an optically variable security feature, which has a visual appearance that depends on the viewing angle. The machine-readable code is a magnetic encoding, which is produced by printing at least one opaque magnetic printing ink containing magnetic pigments, with the magnetic printing ink being incorporated or applied in at least one defined code region such that the visual appearance of the optically variable security feature is determined at least in part by the at least one incorporated or applied magnetic printing ink. The optically variable security feature comprises a micro-optical micro-lens arrangement, which covers the at least one code region in which the at least one magnetic printing ink has been incorporated or applied.

20 Claims, 5 Drawing Sheets

(51) Int. Cl.
*B42D 25/355* (2014.01)
*B42D 25/425* (2014.01)

(58) Field of Classification Search
USPC ........ 283/67, 70, 72, 74, 75, 82, 87, 91, 93, 283/94, 98, 901
See application file for complete search history.

(56) References Cited

U.S. PATENT DOCUMENTS

| | | | | |
|---|---|---|---|---|
| 2013/0234426 | A1 | 9/2013 | Muller et al. | |
| 2014/0151996 | A1* | 6/2014 | Camus | D21H 21/40 283/67 |

FOREIGN PATENT DOCUMENTS

| | | | |
|---|---|---|---|
| DE | 102016014230 | A1 | 5/2018 |
| DE | 102020006240 | A1 | 4/2022 |
| EP | 2417207 | B1 | 10/2015 |
| EP | 2152821 | B1 | 3/2019 |
| KR | 101876310 | B1 | 8/2018 |

* cited by examiner

SECURITY ELEMENT WITH A MACHINE-READABLE CODE AND METHOD FOR PRODUCING THE SAME

BACKGROUND

The present invention relates to a security element, preferably in the form of a foil stripe, foil thread or foil patch, having a machine-readable code, and to a method for producing such a security element.

To protect against counterfeiting, documents of value are typically provided with security elements that implement security features with visually verifiable and/or machine-verifiable properties, which may be used to check the authenticity of the document of value. For this purpose, various security features that differ in particular in terms of the technical means with which the security feature is detectable or verifiable are known in the prior art.

Of particular importance are visual security features with optically variable properties, that is to say the appearance of the visual security feature varies depending on the viewing angle. With continuous variation in the viewing angle, it is thus possible to visualize in particular a tilting and/or movement effect. Such security features are considered to be highly forgery-proof because the optically variable effect that depends on the viewing angle generally cannot be captured by a forger with sufficient precision in order to imitate it. In addition, such optically variable effects cannot be produced by regular printing processes. Examples of optically variable security features are moiré magnifiers, tilting images, holograms and thin-film elements.

The authenticity of documents of value should be checkable not just visually but also by machine. Machine-checkability offers a high level of security and is even absolutely necessary in many technical applications, for example in banknote processing. Apparatuses such as automatic counting machines and vending machines should be able to identify denominations and/or check the authenticity of a banknote.

Known security threads and/or foil elements with visual, in particular optically variable, security features have no effective machine readability. Merely provision of such security elements with encoding that is based on substances that absorb in the infrared and is comparatively easy to imitate or forge is known. Magnetic substances, in turn, are generally easily visible both in reflected and transmitted light, which means that they can disturb the optical appearance of visual, in particular optically variable, security features.

Security elements and/or documents of value with substrates made of a polymer generally do not have any machine-readable security features integrated in the substrate. It is known in particular in the field of banknotes with substrates made of polymer to add printed magnetic encoding. A disadvantage of this is that the printed magnetic encoding is easily rubbed off, in particular with banknotes that are in circulation. In addition, the magnetic substances applied on the banknotes can be comparatively effortlessly removed, analyzed and/or imitated by a forger. It is also possible to use the removed magnetic substances directly for forging purposes.

Printing inks with magnetic pigments for intaglio printing or gravure printing are known for example from EP 2 417 207 B1.

SUMMARY

Against this background, it is the object of the present invention to propose a solution to the aforementioned problems. In particular, there is a need for a security element with a machine-readable code that can be reliably checked for authenticity.

The present invention achieves this object by the appended independent claims. Preferred embodiments of the invention are specified in the claims which are dependent thereon.

According to a first aspect of the present invention, a security element is provided, preferably in the form of a security stripe (also: foil stripe), security thread (also: foil thread) or security patch (also: foil patch). The security element has a machine-readable code and an optically variable security feature, which has a visual appearance that depends on the viewing angle. The machine-readable code comprises a magnetic encoding (also: code), which is produced by printing at least one opaque magnetic printing ink containing magnetic pigments, with the magnetic printing ink being incorporated or applied in at least one defined code region such that the visual appearance of the optically variable security feature that depends on the viewing angle is determined at least in part by the at least one incorporated or applied magnetic printing ink. The optically variable security feature comprises a micro-lens arrangement, which covers the at least one code region in which the at least one magnetic printing ink has been incorporated or applied.

In other words, it is proposed to produce a magnetic encoding with the aid of at least one magnetic printing ink which is incorporated or applied for example as part of a positive or negative print in particular in a code region that is visible in a top view of the security element. The magnetic ink has been applied in the region of the optically variable security feature in such a way that it, or its magnetic pigments, defines the visual appearance of the optically variable security feature or at least partly represents it and thus determines it. The optically variable security feature advantageously comprises a micro-lens arrangement of, for example, spherical or aspheric lenses, rod lenses and/or cylindrical lenses, which covers the at least one code region in which the magnetic printing ink has been incorporated or applied. The security element consequently has an interior, magnetic encoding which is protected well against mechanical wear by the micro-lens arrangement that lies on top of it.

What is meant by at least partly representing the visual appearance of the optically variable security feature is in particular that the magnetic printing ink is not necessarily the only ink that is used to represent the optically variable security feature. It should furthermore be understood that additional elements, such as micro structuring, micro depressions, relief structures or the like, which are used to produce the respective optically variable security feature may be present.

Optically variable security features take the form for example of moiré magnifiers, tilting images, holograms and/or thin-film elements. The optically variable security feature proposed in this description uses for the purpose of generating the optically variable effect the micro-lens arrangement, which has an optical imaging behaviour that is suitable herefor.

The at least one magnetic printing ink is an opaque ink with a colour impression corresponding to a coloured ink, in particular red, green, blue, white or black.

Since the magnetic encoding and the optically variable appearance are brought about at least in part by the at least one magnetic printing ink, a mutually disturbing influence can be reduced. Visual and magnetic security features can thus be detected equally reliably.

In addition, the magnetic encoding in the security element according to the invention is incorporated in, and thus correlated with, the visual appearance of the optically variable security feature. This advantageously allows the implementation of further security levels to increase the counterfeit protection, in particular such that combinations of optically and magnetically detectable features are used.

The security element preferably serves for raising the barrier to counterfeiting a document of value. Documents of value are in particular understood to mean banknotes, shares, identification documents, credit cards, certificates, insurance cards and generally documents at risk of being forged, including for example product security elements such as labels and packaging for high-quality products. The term "document of value" in this description comprises not only finished documents of value capable of being put into circulation, but also precursors of the documents of value, such as security papers that do not have all the features of a document of value that is capable of being put into circulation, including those in the form of sheets or rolls. The security elements have, for example, foil elements in the form of threads, stripes or patches which have been applied to a document of value or have been at least partially incorporated in a document of value, such as for example window security threads and woven security threads, which are used to cover through-openings in a document of value.

The detection or checking of the magnetic encoding includes the detection of the magnetic printing ink or printing ink layer on the basis of the magnetic properties of the associated magnetic pigments. The authenticity check of the security elements comprises for example the determination of a magnetic field, a magnetic flux density, a magnetization, a remanence, a coercivity and/or a hysteresis. For detection purposes, the magnetic properties of the magnetic pigments or their distribution can be captured for example with the aid of known magnetic sensors.

In comparison with security elements having encodings that are based on substances that absorb in the infrared spectral range, magnetic encoding presents a greater barrier to counterfeiting. In addition, security elements, in particular foil or security threads, with optically variable properties and magnetic encodings are more easily machine-readable than those that are designed merely with encodings that absorb in the infrared spectral range.

The visual security feature is implemented for example in simple designs by way of visible code regions which are provided in or on the security element and on which the at least one magnetic printing ink, preferably with different magnetic printing inks, for example in the form of motifs or symbols is printed. The magnetic printing ink used is opaque and corresponds to a body colour that represents the optical appearance of the optically variable security feature. The code region on which such a magnetic printing ink has been printed provides machine-readable magnetic encoding which does not disturb the design or appearance of the visual security feature and preferably cannot be optically separated therefrom without further aids.

It should be understood that further printing inks with magnetic and/or non-magnetic pigments may be provided for representing the optical appearance of the security element, in particular of the optically variable security feature. It should also be understood that various magnetic printing inks or additional inks with non-magnetic pigments can be incorporated or applied at least zonally in a single code region.

In some configurations, a plurality of code regions are provided. In these cases, the code regions are, for example, spatially separated regions or regions that overlap one another at least zonally, in which the magnetic printing ink or inks are incorporated or applied.

According to advantageous configurations, the optically variable security feature comprises a moiré magnifier. Moiré magnifiers are multi-layered structures that comprise a typically focusing micro-lens arrangement, a transparent or translucent image layer with an arrangement of image elements, in particular micro-images, and optionally a spacer layer between the micro-optical relief structure and the image layer. The image elements or micro-images are magnified when viewed through the lenses or are optically varied in another way. Further functional layers and/or auxiliary layers may additionally be present.

The at least one magnetic printing ink is preferably incorporated in micro-depressions, in particular in micro-depressions for image elements such as micro-images, which are stamped into a transparent or translucent image layer, in particular embossing varnish layer, of the security element. Such configurations can thus utilize the embossed micro-depressions of the optically variable security feature for an additional magnetic feature, specifically as a code region for the magnetic encoding.

Micro-depressions for micro-images which are imaged or magnified to produce the optically variable security feature by means of micro-optical relief structures typically have very small dimensions and are therefore inherently difficult to imitate.

In advantageous configurations, the magnetic pigments of the magnetic printing inks incorporated in the micro-depressions have a diameter of less than 2 μm. Magnetic pigments of such small dimensions are suitable in particular to colour micro-depressions for micro-images of optically variable security features, for example moiré magnifiers, and to correspondingly provide code regions there for the machine-readable, magnetic encoding.

Alternatively or additionally, the security element has an opaque capping layer which is formed as a colour layer by means of the at least one magnetic printing ink. In such configurations, typically larger areas, in particular in comparison with the micro-depressions, which provide improved encoding and machine-readability can be implemented. In such configurations, the magnetic encoding is, for example, a motif print with cutouts, that is to say what is known as clear text or negative print, or positive print in the form of characters and/or patterns.

The magnetic pigments of the at least one magnetic printing ink, by means of which the opaque capping layer is formed, preferably have a diameter from 2 μm to 10 μm, with particular preference from 3 μm to 5 μm.

The opaque capping layer preferably has at least one cutout representing a motif, character or symbol in negative print.

In advantageous configurations, the machine-readable magnetic encoding comprises at least one further opaque magnetic printing ink containing magnetic pigments. The magnetic pigments of the various magnetic printing inks differ in terms of their colour and/or magnetic properties, in particular in terms of their magnetic coercivity. The further magnetic printing ink is incorporated or applied as part of the magnetic encoding at least zonally in a code region on which the magnetic printing ink has been printed or in another code region of the security element.

According to possible exemplary embodiments, the at least two magnetic printing inks correspond to the same colour and differ in terms of their magnetic properties, in particular with respect to their coercivity ("magnetic Gemini").

According to other possible exemplary embodiments, the at least two magnetic printing inks correspond to different colours and do not differ in terms of their magnetic properties, in particular with respect to their coercivity ("magnetic solitaire").

Alternatively, the at least two magnetic printing inks differ both in terms of their colour and also in terms of their magnetic properties, in particular coercivity.

In advantageous configurations, two or more magnetic printing inks whose magnetic pigments differ in terms of their magnetic coercivity are used. In this case, the code regions are characterized by regions with high magnetic coercivity and regions with low magnetic coercivity (what is known as HiCoLoCo magnetic encoding).

According to possible configurations, at least two magnetic inks are incorporated or applied in different code regions, which are formed as regions that are spaced apart from one another in a top view or are arranged so as to overlap one another in a top view. For this purpose, at least two magnetic printing inks are printed on a code region so as to overlap at least zonally, for example.

In advantageous configurations, at least one of the magnetic printing inks is incorporated or applied with a variable layer thickness in one of the code regions, which represents a further security feature to increase the counterfeit protection. The code regions are therefore not necessarily printed uniformly, that is to say, provision is in particular made for magnetic printing inks to be printed progressively onto the code regions and/or for an ink application having a variable layer thickness to be provided there.

According to possible configurations of the invention, the magnetic pigments in the magnetic printing ink(s) comprise a magnetized or magnetizable core, which is surrounded or encapsulated by an opaque dye. It should be understood here in particular that the magnetic or magnetizable core is surrounded at least zonally, preferably entirely, by the opaque dye. Magnetic pigments having such a structure can be produced, for example, in accordance with the teaching of EP 2 152 821 B1. The ink layer can have an opaque body colour that deviates from the core, for example red, green, blue, white, black and or shiny metallic, wherein the metallic sheen substantially corresponds to the sheen of silver, gold, copper, chromium or another metal.

It has been found that a magnetic printing ink which contains silver-encapsulated pigments and has been applied on one side of the security element is not visible, or visible only to a greatly reduced extent, on the opposite side. In this way, disturbing influences on visual or optically variable security features can also be avoided.

The security element preferably takes the form of a foil or security thread, in particular microlens thread.

A second aspect of the present invention relates to a document of value such as a banknote having a security element with the features described here. Advantages of the document of value that has been secured with the security element according to the invention for example relating to counterfeit protection are the direct result of the relevant disclosure of the security element according to the invention.

To secure the document of value, configurations with a plurality of security elements which are connected to this document of value in particular with register accuracy, for example in a manner such that the security element cannot be removed from the document of value, or can be removed only with significant technical effort, are provided. Such embodiments enable the combination of magnetic encodings and/or visual, in particular optically variable, security features which are produced by different security elements in particular such that the entirety of the different security elements produce overall information which can be used to verify the authenticity of the document of value.

In possible exemplary embodiments, the combination of magnetic encodings on a security thread and/or a security patch applied on the document of value and/or security thread and/or further security elements printed onto the document of value results in overall information, wherein preferably combinations are provided:

- printed security features and magnetic security features of a security thread;
- printed security features and magnetic security features of a security patch and/or security stripe;
- magnetic security features of a security thread and of a security patch and/or security stripe;
- printed security features and magnetic security features of a security thread and magnetic security features of a security patch and/or security stripe.

The corresponding security elements or security features can have been applied in particular on the front or rear side of the document of value or of the banknote or have been embedded inside the document of value or in one of the security elements.

Preferably, a denomination identification of a banknote that has been provided with the security element is enabled by reading the magnetic encodings disclosed here. In contrast to encodings which are based on substances absorbing in the infrared spectral range, the magnetic encoding is easily readable independently of the orientation of the security element or of a document of value that is provided with the security element. This allows in particular reliable reading of banknotes having such security elements in a banknote processing machine, for example for identifying denominations. The signals from the magnetic encoding are generally stronger than those caused by magnetic printing elements such as SPARK® or magnetic numbering.

A third aspect of the present invention relates to a method for producing the security element according to the invention. Advantages of the production method are immediately evident from the preceding and subsequent description, in particular with reference to the security element.

During the production of the security element, the magnetic encoding is produced by printing in a manner such that the at least one opaque magnetic printing ink containing magnetic pigments is incorporated or applied in at least one defined code region that is visible in a top view of the security element and is or has been covered by a micro-lens arrangement. The incorporation or application of the magnetic printing ink in the at least one code region is thus effected such that the visual appearance of the optically variable security feature, which depends on the viewing angle, is determined at least in part by the at least one incorporated or applied magnetic printing ink.

The printing method used can be for example an intaglio printing method or gravure printing method.

The magnetic printing ink or inks is or are used preferably for producing image elements such as micro-images of optically variable security features. Alternatively or additionally, the magnetic printing ink or inks is or are used to provide a substantially extensive, in particular full-area, print. Provision is made for example in some configurations for a HiCoLoCo magnetic encoding to be produced which is optically inconspicuous or concealed, in particular in the image elements or in opaque white.

It is likewise possible to produce an additional or combined encoding which is based on substances that absorb in the infrared (IR) spectral range. Preferred in this connection are IR-absorbing pigments by SICPA (SICPA SA, AVE de Florian 41, 1008, Prilly, Switzerland) or printing inks sold under the name SICPATALK®.

BRIEF DESCRIPTION OF THE DRAWINGS

Further aspects, features and advantages of the present invention will become clear from the following detailed description of preferred embodiments and embodiment variants with reference to the attached figures, in which.

DETAILED DESCRIPTION OF THE INVENTION

The invention will be explained below by way of example with reference to the drawings illustrating specific exemplary embodiments of the invention. These exemplary embodiments are described in detail and enable a person skilled in the art to technically implement the invention. The embodiments described are not mutually exclusive but rather supplement one another. To this extent a specific feature, a specific structure or a specific property described in relation to one embodiment can also be implemented in relation to other embodiments without deviating from the subject matter of the invention. Furthermore, the position or arrangement of individual elements or steps within the described embodiments can be modified of course without deviating from the subject matter of the invention. For this reason, the following description of the attached figures should not be understood to be restrictive because the scope of the invention is defined only by the attached claims and also comprises variants and equivalents, which will not be expressly described below.

Figure 1:
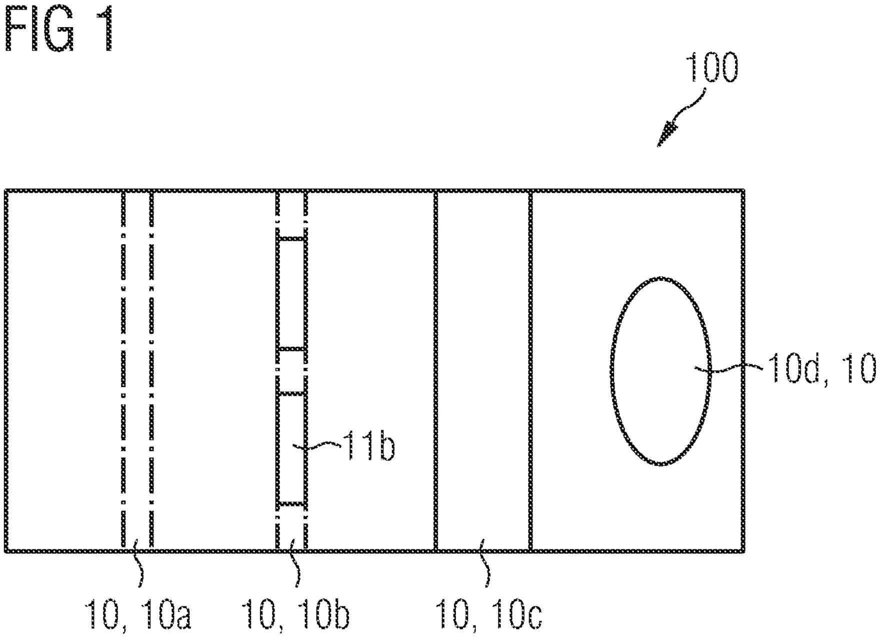
FIG. 1 shows a document of value with security elements in a top view in accordance with possible embodiments of the invention.

FIG. 1 shows a schematic view of a document of value 100, which is provided with different security elements 10 preferably arranged in a defined orientation, in particular with register accuracy, in relation to one another and with respect to the document of value 100. It shows security element 10, which are designed by way of example as a security thread 10*a*, window security thread 10*b*, security stripe 10*c* or security patch 10*d*. The document of value 100 shown in FIG. 1 is, for example, a banknote with a substrate made of cotton paper in which the security thread 10*a* is embedded. The security thread 10*b* is what is referred to as a window thread, which is embedded in the substrate of the document of value 100 such that it is visible in alternation on opposite sides of the document of value 100 in windows 11*b*.

FIG. 1 shows a multiplicity of different security elements 10, 10*a*, 10*b*, 10*c*, 10*d*, which do not necessarily have to be implemented in the entirety that is illustrated. It should be understood that an individual security element 10, in particular with register-accurate application, can already represent a sufficiently forgery-proof security feature for the document of value 100. In preferred configurations, a plurality of security elements 10 can be provided to increase the counterfeit protection, such as for example any desired combination of the security features shown in FIG. 1.

Figure 2:
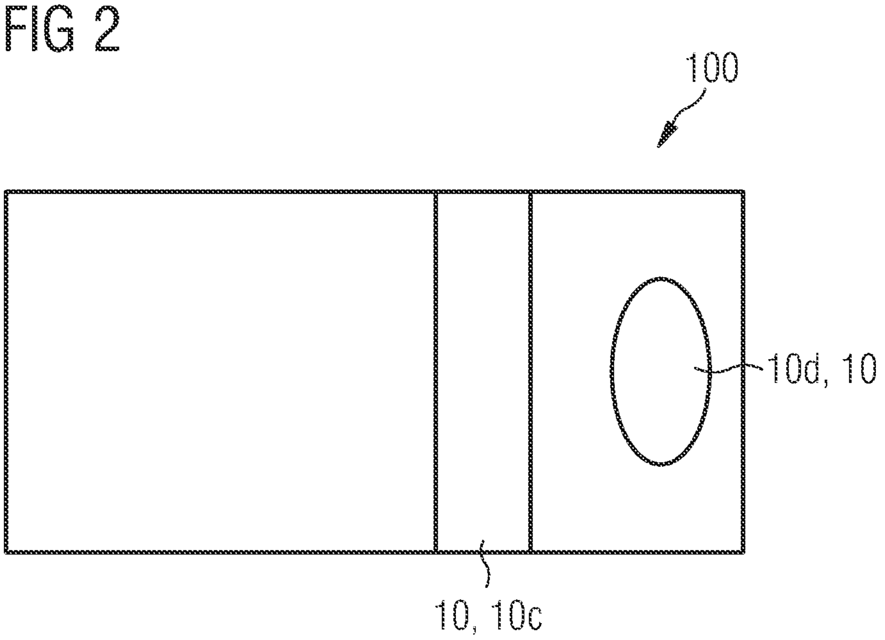
FIG. 2 shows a further document of value with security elements in a top view in accordance with possible embodiments of the invention.

FIG. 2 shows by way of example a further document of value 100 with security elements 10, which are designed as security stripe 10*c* and security patch 10*d* respectively. The document of value 100 shown in FIG. 2 can be, for example, a banknote with a polymer substrate, in particular made of polyethylene terephthalate, or a foil composite banknote.

Figure 3:
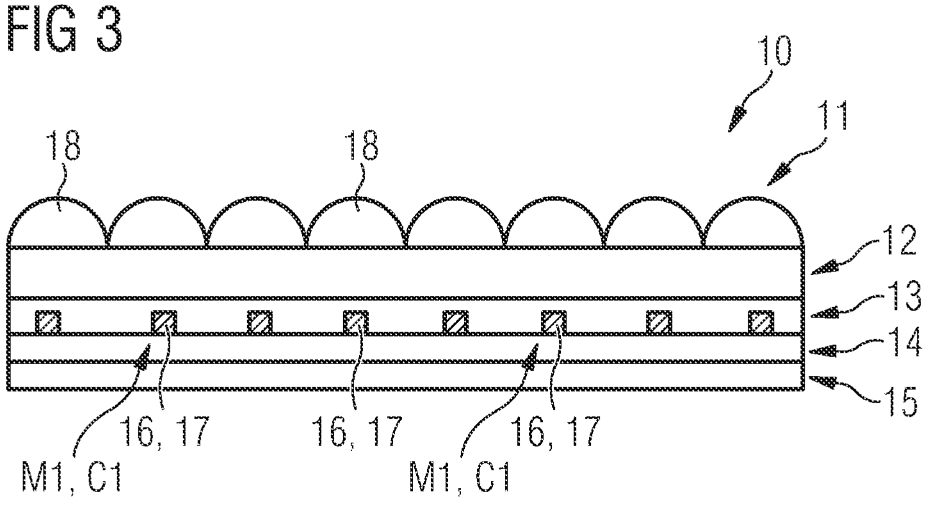
FIG. 3 shows a schematic cross-sectional illustration of a security element with an optically variable security feature and a magnetic encoding in accordance with one possible embodiment of the invention, wherein the magnetic encoding is formed by printing using magnetic pigments of a magnetic printing ink.
Figure 4:
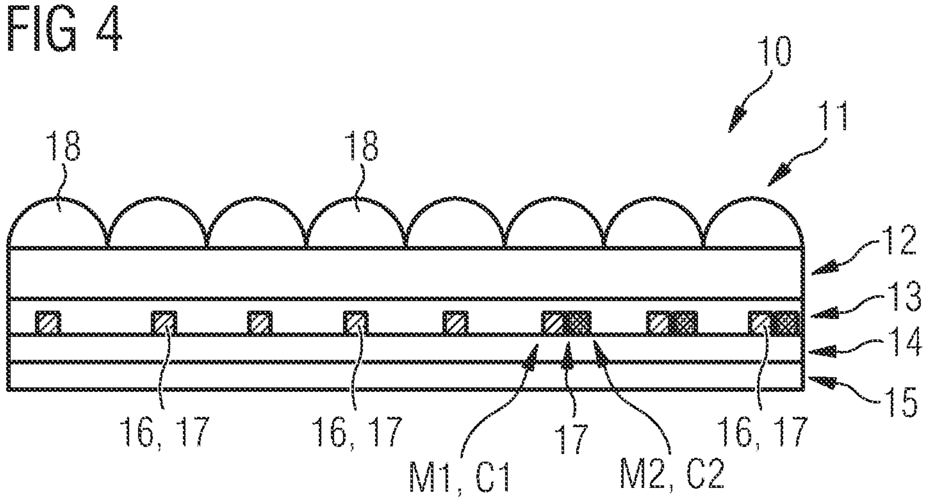
FIG. 4 shows a schematic cross-sectional illustration of a security element with an optically variable security feature and a magnetic encoding in accordance with one possible embodiment of the invention, wherein the magnetic encoding is formed by printing using different magnetic pigments of two magnetic printing inks.
Figure 5:
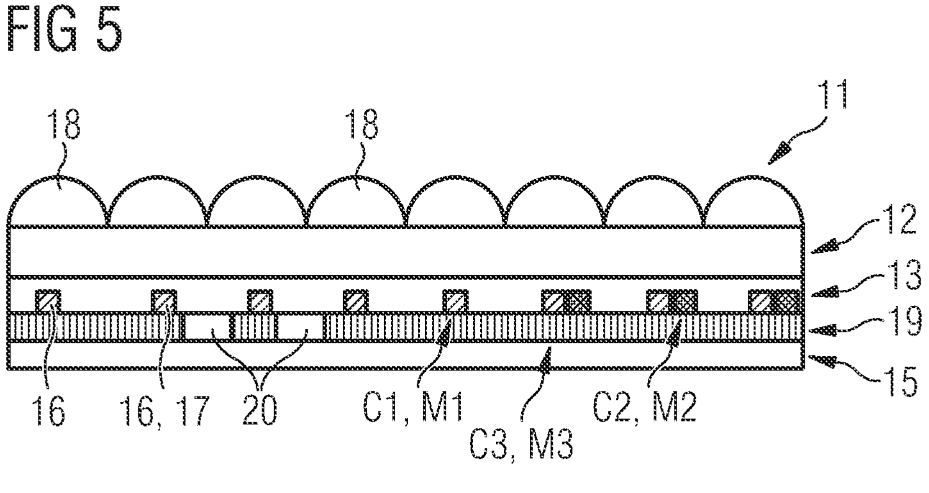
FIG. 5 shows a schematic cross-sectional illustration of a security element with code regions of a magnetic encoding in the form of a zonally opaque capping layer.

The security elements 10 are provided with a machine-readable code comprising a magnetic encoding which is produced by printing in code regions C1, C2, C3 using opaque magnetic printing inks M1, M2, M3 which are incorporated or applied at least zonally. FIGS. 3 to 5 illustrate corresponding embodiments in cross section and FIGS. 6 to 15 illustrate corresponding embodiments in a top view.

The magnetic printing inks M1, M2, M3 contain magnetic pigments of different types such that they differ in terms of their colour and/or magnetic properties, for example in terms of their coercivity. The magnetic encoding encodes for example information assigned to the security element 10 or the document of value 100, such as a denomination or the like. In other words, the denomination of the document of value 100 for example can be identified on the basis of the magnetic encoding. The authenticity check of the security elements 10 includes the detection of the magnetic printing inks M1, M2 and their magnetic pigments by means of magnetic sensors, preferably in combination with the detection of an optically variable security feature which is correlated with the magnetic encoding.

FIGS. 3 to 15 show security elements 10 with magnetic encodings which provide in the code regions C1, C2, C3 part of a visual security feature, in particular the magnetic printing inks M1, M2 incorporated in the code regions C1, C2 provide an optically variable security feature (see FIGS. 3 and 4).

The code regions C1, C2, C3, which are visible in a top view of the front side of the security element 10, are produced by magnetic printing inks M1, M2, M3 which are incorporated or applied in the code regions and contain magnetic pigments.

FIG. 3 shows in cross section a security element 10 implementing a visually capturable, optically variable security feature, in particular a moiré magnifier. The security element 10 has a multi-layered structure, wherein a micro-lens arrangement 11 forms a top layer on the viewed side or in a top view and protects the underlying layers against mechanical wear. The micro-lens arrangement 11 illustrated comprises a multiplicity of micro-lenses 18, which are focused at underlying image elements 16 (also: micro-images). Upon viewing through the micro-lens arrangement 11, the image elements 16 are magnified or optically varied in a different way in order to produce the optically variable effect.

The moiré magnifier of FIG. 3 furthermore comprises a spacer layer 12, which is arranged between the micro-lens arrangement 11 and an image layer 13 containing the image elements 16, and functional layers 14, 15. Further machine-readable features can be implemented in the functional layer 14. The further functional layer 15 consists for example of an adhesive layer for appropriately attaching the security element 10 to the document of value 100. The image layer 13 in the illustrated embodiment consists of a transparent embossing varnish, into which micro-depressions 17 have been stamped. Alternatively, the image layer 13 can be formed from a translucent material. The micro-depressions 17 are filled with the same magnetic printing ink M1 and form the image elements 16 as what are known as micro-images.

The micro-lenses 18 and the image elements 16 in each case form a two-dimensional arrangement. The image layer 13 and the micro-lens arrangement 11 produce the optically variable security feature. The security feature that is optionally contained in the functional layer 14 is based for example on substances that have been incorporated there and are absorbing, fluorescent and/or phosphorescent in the infrared spectral range. According to other variants, the functional layer 14 has primers or ink-receptive layers.

FIG. 4 shows a further security element 10 with a structure that is largely analogous to FIG. 3. In contrast to the exemplary embodiment of FIG. 3, some of the micro-depressions 17 that form the image elements 16 are filled with two different magnetic printing inks M1, M2, which differ for example in terms of their coercivity and thus provide what is known as a HiCoLoCo encoding.

In the exemplary embodiments illustrated in FIGS. 3 to 5, the code regions C1, C2 are produced by virtue of the fact that the micro-depression 17 are filled not with any arbitrary coloured substance but with a magnetic printing ink M1, M2 or with a plurality of magnetic printing inks M1, M2. Consequently, the magnetically readable or magnetic code is produced in an interior region of the security element 10 which is well protected against external mechanical influences, in particular when the security element 10 or the document of value 100 that is provided with the security element 10 is in circulation.

Since the micro-depressions 17 are filled at least partially with magnetic printing inks M1, M2 and are optically imaged by means of the micro-lens arrangement 11, the magnetic printing inks M1, M2 at least partially determine a visual appearance which depends on the viewing angle.

Based on the small spatial extent of the micro-depressions 17, the magnetic pigments in the magnetic printing inks M1, M2 which are incorporated there preferably have a diameter of less than 2 μm.

The magnetic pigments in the magnetic printing inks M1, M2, M3 preferably comprise a magnetized or magnetizable core, which is surrounded by an opaque dye. The dye corresponds to an opaque body colour, for example red, green, blue, black or white and/or is shiny metallic, for example in accordance with the metallic sheen that is imparted by silver, gold, copper, chromium or another metal.

According to possible variants, at least two of the magnetic printing inks M1, M2, M3 correspond to the same colour and differ in terms of their magnetic properties, in particular their coercivity. In alternative embodiments, the at least two magnetic printing inks M1, M2, M3 correspond to different colours and do not differ in terms of their magnetic properties. Generally, the magnetic printing inks M1, M2, M3 can differ both in terms of their colour and also in terms of their magnetic properties.

In a further exemplary embodiment (not illustrated in more detail), the functional layer 14 shown in FIG. 4 is designed as an opaque capping layer, which is to say a capping layer which substantially does not transmit light. Magnetic printing inks M1, M2, M3 have been printed on the opaque capping layer zonally extensively on the side facing away from the micro-lens arrangement 11 such that they do not become visible on the viewed side or in a top view and the optically variable appearance of the optically variable security feature is consequently not influenced in a disturbing manner. Extensively printing using magnetic printing inks M1, M2, M3 enables the implementation of relatively large code regions C1, C2, C3, which are readable correspondingly reliably by means of common magnetic sensors. In order to generate signatures which can be captured even better, magnetic printing inks M3 with magnetic pigments which have a larger diameter in comparison with the pigments introduced in the micro-depressions 17, for example from 2 μm to 10 μm, with particular preference from 3 μm to 5 μm, are preferably used.

Optionally, a magnetic printing ink M1, M2, M3 can also be printed on the rear side of the security element 10, in particular of the security thread 10*a*, 10*b*. In this case, too, typically larger areas compared with the micro-depression 17 which ensure reliable encoding and machine-readability may be realized. In particular, a magnetic printing ink which is encapsulated by silver and contains magnetic pigments is not visible in reflected light on the front side of the security element 10 if it is applied on the rear side of the security element 10.

FIG. 5 shows a further exemplary embodiment of the security element 10, which produces an optically variable security feature by means of an optical relief structure 11 and image elements 16 similar to the embodiment illustrated in FIG. 4. In this respect, the description relates to the description of FIG. 4.

The exemplary embodiment according to FIG. 5 comprises a functional layer which is formed as opaque capping layer 19 of the magnetic printing ink M3 and defines at least one further, relatively large-area code region C3 of the magnetic encoding. Accordingly, the magnetic printing ink M3 preferably has magnetic pigments having a diameter of from 2 μm to 10 μm, with particular preference from 3 μm to 5 μm.

The opaque capping layer 19 in FIG. 5 forms a colour layer with cutouts 20 in the form of a negative print (clear text), which is easily visible in particular when viewed in transmitted light.

It should be understood that forging the machine-readable magnetic encodings becomes more difficult as the number of magnetic printing inks M1, M2, M3 used rises and the complexity of the shapes of the code regions C1, C2, C3 or their partial areas, to which within the individual code regions C1, C2, C3 in each case one magnetic printing ink M1, M2, M3 or a mixture of magnetic printing inks M1, M2, M3 is or are applied increases. Increasing the number of code regions C1, C2, C3 also leads to an increase in counterfeit protection.

FIGS. 6 to 9 show different, substantially rectangular security elements 10 having stripe-shaped code regions C1, C2 in a top view. The code regions C1, C2 are visible in a top view and form part of an optically variable security feature.

Figure 6:
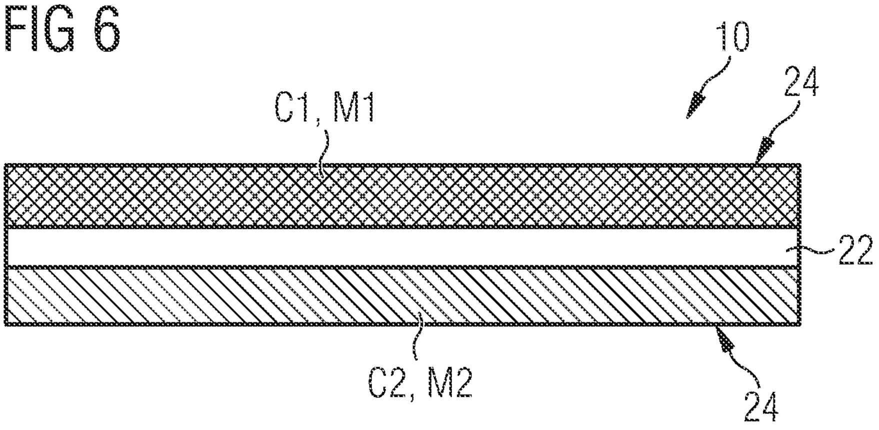
FIGS. 6 to 14 show embodiments of the security element according to the invention with magnetic encodings in a top view which are based on two different magnetic printing inks.

FIG. 6 shows a simple embodiment having two code regions C1, C2, which extend in the form of stripes 24 over the entire longitudinal extent of the security element 10 and are separated from each other by an interposed unprinted region 22. By way of example, the code regions C1, C2 implement a HiCoLoCo encoding, in which the magnetic pigments of the magnetic printing ink M1 of the code region C1 have a higher coercivity than the magnetic pigments of the magnetic printing ink M2 which have been incorporated or applied in the code region C2.

Figure 7:
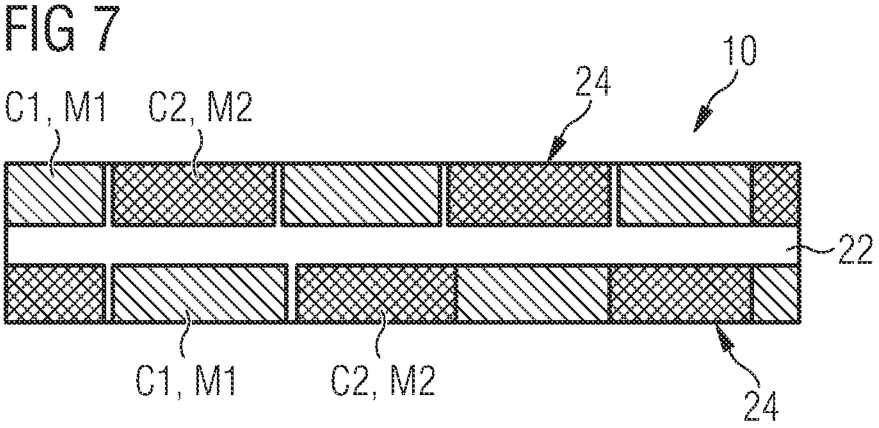

FIG. 7 shows a security element 10 with two parallel stripes 24, which are printed in alternation using magnetic printing inks M1, M2 and thus define alternating code regions C1, C2. The two parallel longitudinal stripes 24 are separated from one another by the unprinted region 22.

Figure 8:
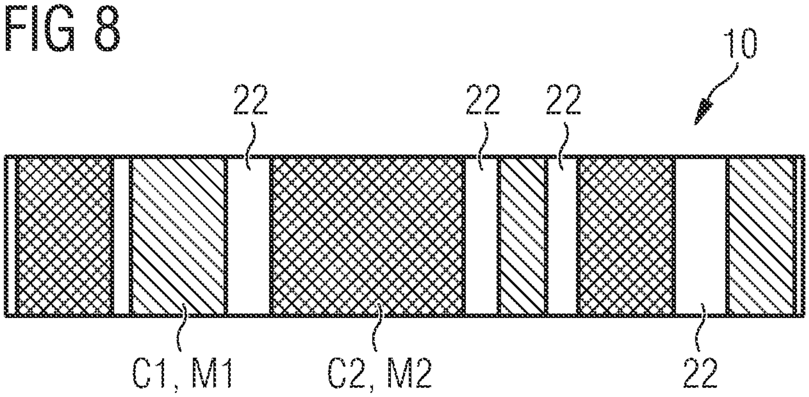

In the embodiment shown in FIG. 8, the security element 10 is in the shape of a stripe and is printed in the longitudinal direction in alternation using magnetic printing inks M1, M2 in a manner such that substantially rectangular code regions C1, C2 of different sizes are formed, which are spaced apart from one another by unprinted regions 22.

The term "unprinted" should herein be understood to mean that no magnetic printing inks M1, M2, M3 or their pigments have been incorporated or applied in the unprinted region 22.

Figure 9:
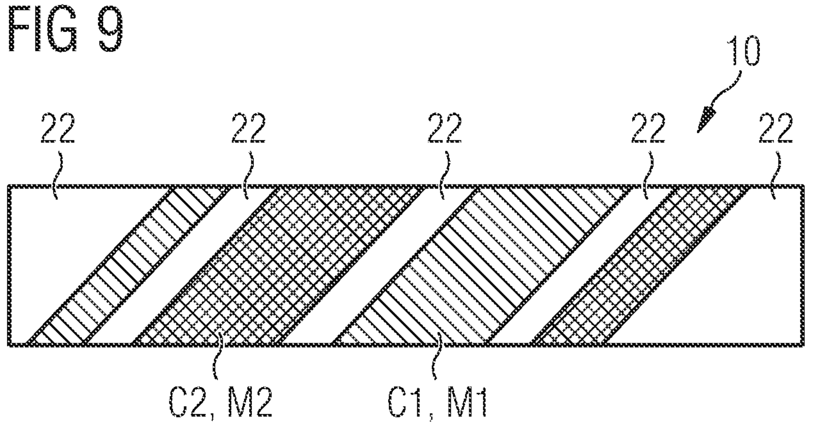

FIG. 9 shows an embodiment similar to FIG. 8, but in which the code regions C1, C2 are in the form of diagonal stripes.

Figure 10:
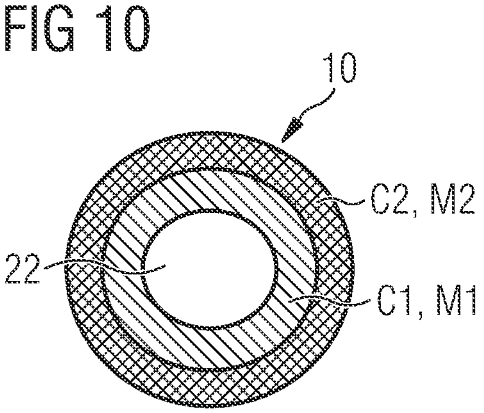
Figure 11:
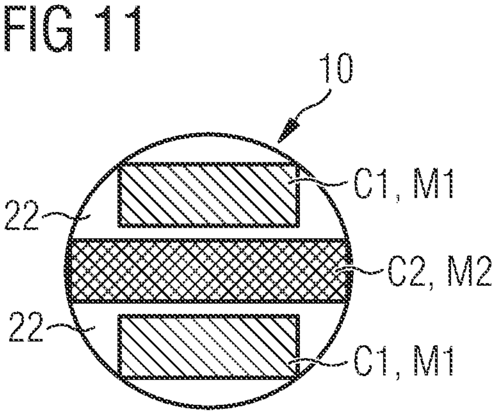

FIGS. 10 and 11 show further security elements 10, which are visible in a top view as circular structures. In the embodiment of FIG. 10, the code regions C1, C2 are in the form of concentric circular rings, which are arranged around a central unprinted region 22. FIG. 10 shows a circular security element 10 with stripe-shaped code regions C1, C2, which are arranged parallel to one another and are spaced apart from one another on the viewed side.

Figure 12:
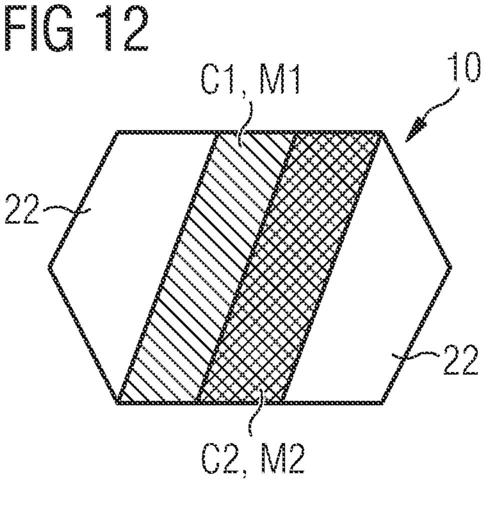

FIG. 12 shows a security element 10 with a hexagonal appearance in a top view. The code regions C1, C2 having magnetic printing inks M1, M2 are in the form of diagonal stripes.

Figure 13:
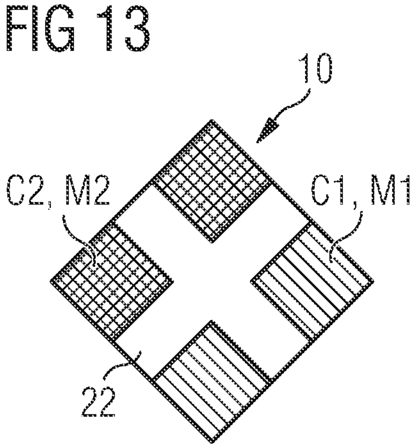

FIG. 13 shows a substantially square security element 10 with code regions C1, C2, which are spatially separated from one another by a cross-shaped, unprinted region 22.

Figure 14:
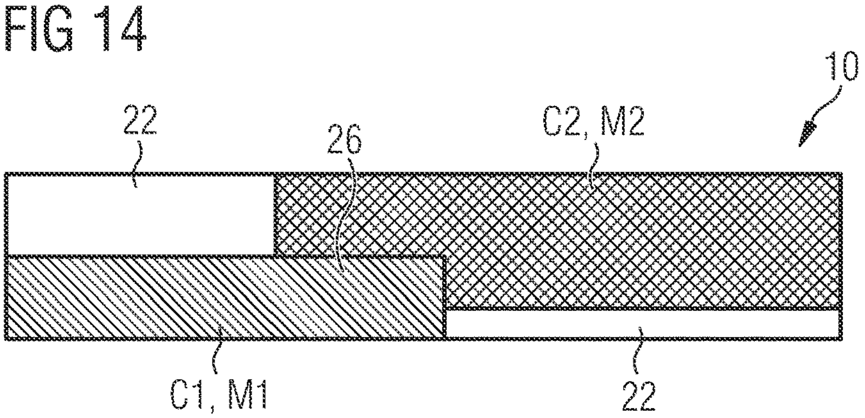

FIG. 14 shows a security element 10 in a top view, in which two stripe-shaped code regions C1, C2 partly overlap one another in an overlap section 26.

FIGS. 15*a* to 15*d* show examples of code regions C1, C2 of security elements 10, on which magnetic printing inks M1, M2 have been printed non-uniformly or in which the magnetic printing inks M1, M2 have been incorporated or applied with a variable layer thickness.

Figure 15A:
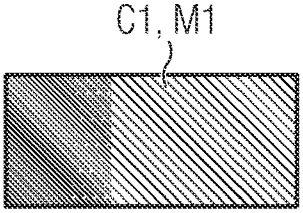
FIGS. 15*a* to 15*e* show schematic exemplary embodiments with code regions in a top view which have been printed in a progressive or non-uniform manner and represent visual security features.
Figure 15B:
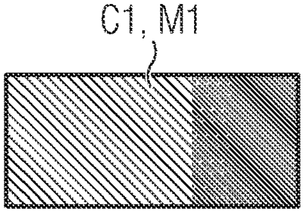
Figure 15C:
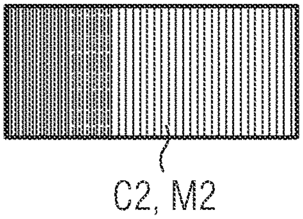
Figure 15D:
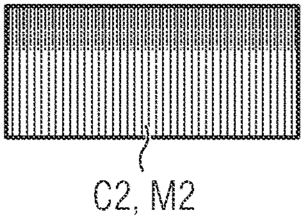
Figure 15E:
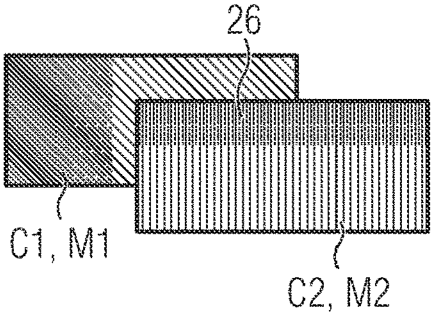

FIG. 15*e* shows an exemplary embodiment with two code regions C1, C2, on which magnetic printing inks M1, M2 have been printed non-uniformly and which overlap in the overlap region 26.

In a method for producing the security element, the magnetic encoding is produced by printing. At least one opaque magnetic printing ink M1, M2, M3 having magnetic pigments is incorporated or applied in defined code regions C1, C2, C3 of the security element 10 (cf. FIGS. 3 to 15), specifically in a manner such that it provides at least a part of an optically variable security feature.

For this purpose, the micro-depressions 17 of a moiré magnifier can be filled with the same magnetic printing ink M1, as is shown in particular in FIG. 3.

Alternatively, the micro-depressions 17 can also be printed with different magnetic printing inks M1, M2, M3 to provide the image elements 16.

The opaque capping layer 19 of FIG. 5 can also be formed, by way of example, by a single magnetic printing ink M3 or by different magnetic printing inks M1, M2, M3 and in particular encode characters, symbols or other motifs as cutouts 20 in negative print.

The code regions C1, C2, C3 are arranged to provide the optically variable security feature below the micro-lens arrangement 11. For this purpose, the micro-lens arrangement 11 will be connected for example by way of lamination to the image layer 13 before or after the printing with magnetic inks M1, M2, M3.

The invention is explained above by way of example with reference to the drawings illustrating specific exemplary embodiments of the invention. These exemplary embodiments are described in detail above and enable a person skilled in the art to technically implement the invention. The embodiments described are not mutually exclusive but rather supplement one another. To this extent a specific feature, a specific structure or a specific property described in relation to one embodiment can also be implemented in relation to other embodiments without deviating from the subject matter of the invention. Furthermore, the position or arrangement of the individual elements or steps within the described embodiments can be modified of course without deviating from the subject matter of the invention. For this reason, the description of the attached figures should not be understood to be restrictive because the scope of the invention is defined only by the attached claims and also comprises variants and equivalents, which are not expressly described.

The invention claimed is:

1. A security element having a machine-readable code and an optically variable security feature, which has a visual appearance that depends on a viewing angle,
   - wherein the machine-readable code is a magnetic encoding, which is produced by printing at least one opaque magnetic printing ink containing magnetic pigments, with the at least one opaque magnetic printing ink being incorporated or applied in at least one defined code region such that the visual appearance of the optically variable security feature is determined at least in part by the at least one incorporated or applied opaque magnetic printing ink,
   - wherein the optically variable security feature comprises a micro-optical micro-lens arrangement, which covers the at least one defined code region in which the at least one opaque magnetic printing ink has been incorporated or applied,
   - wherein the at least one opaque magnetic printing ink has been incorporated in micro-depressions which have been stamped into a transparent or translucent image layer of the security element.

2. The security element according to claim 1, wherein the optically variable security feature comprises a moiré magnifier.

3. The security element according to claim 1, wherein the magnetic pigments of the at least one opaque magnetic printing ink which has been incorporated in the micro-depressions have a diameter of less than 2 μm.

4. The security element according to claim 1, wherein an opaque capping layer of the security element is formed as a colour layer by means of the at least one opaque magnetic printing ink.

5. The security element according to claim 4, wherein the magnetic pigments of the at least one opaque magnetic printing ink, by means of which the opaque capping layer is formed, have a diameter of from 2 μm to 10 μm.

6. The security element according to claim 4, wherein the opaque capping layer has at least one cutout, which represents a motif, character or symbol in negative print.

7. The security element according to claim 1, wherein the machine-readable code comprises at least one further opaque magnetic printing ink containing magnetic pigments, wherein the magnetic pigments of the at least one opaque magnetic printing ink and the magnetic pigments of the at least one further opaque magnetic printing ink differ in terms of colour and/or magnetic properties.

8. The security element according to claim 7, wherein at least two of the at least one opaque magnetic printing ink and the at least one further opaque magnetic printing ink correspond to a same colour and differ in terms of their magnetic properties, or at least two of the at least one opaque magnetic printing ink and the at least one further opaque magnetic printing ink correspond to different colours and do not differ in terms of their magnetic properties.

9. The security element according to claim 7, wherein at least two of the at least one opaque magnetic printing ink and the at least one further opaque magnetic printing ink have been incorporated or applied in different code regions, which are formed as regions that are spaced apart from one another in a top view and/or are arranged so as to overlap one another in a top view.

10. The security element according to claim 1, wherein the magnetic pigments of the at least one opaque magnetic printing ink comprise a magnetized or magnetizable core, which is surrounded by an opaque dye.

11. The security element according to claim 1, wherein the at least one opaque magnetic printing ink has been incorporated or applied in one of the at least one defined code regions with a variable layer thickness.

12. The security element according to claim 1, wherein the security element is in a form of a foil thread.

13. A document of value having at least one security element according to claim 1.

14. A method for producing a security element according to claim 1, wherein the magnetic encoding is produced by printing by way of the at least one opaque magnetic printing ink containing magnetic pigments being incorporated or applied in at least one defined code region, which is visible in a top view of the security element and is covered by a micro-lens arrangement, such that the visual appearance of the optically variable security feature which depends on the viewing angle is determined at least in part by the at least one incorporated or applied opaque magnetic printing ink.

15. A security element having a machine-readable code and an optically variable security feature, which has a visual appearance that depends on a viewing angle, wherein the machine-readable code is a magnetic encoding, which is produced by printing at least one opaque magnetic printing ink containing magnetic pigments, with the at least one opaque magnetic printing ink being incorporated or applied in at least one defined code region such that the visual appearance of the optically variable security feature is determined at least in part by the at least one incorporated or applied opaque magnetic printing ink, wherein the optically variable security feature comprises a micro-optical micro-lens arrangement, which covers the at least one defined code region in which the at least one opaque magnetic printing ink has been incorporated or applied, wherein an opaque capping layer of the security element is formed as a colour layer by means of the at least one opaque magnetic printing ink.

16. A security element having a machine-readable code and an optically variable security feature, which has a visual appearance that depends on a viewing angle, wherein the machine-readable code is a magnetic encoding, which is produced by printing at least one opaque magnetic printing ink containing magnetic pigments, with the at least one opaque magnetic printing ink being incorporated or applied in at least one defined code region such that the visual appearance of the optically variable security feature is determined at least in part by the at least one incorporated or applied opaque magnetic printing ink, wherein the optically variable security feature comprises a micro-optical micro-lens arrangement, which covers the at least one defined code region in which the at least one opaque magnetic printing ink has been incorporated or applied, wherein the machine-readable code comprises at least one further opaque magnetic printing ink containing magnetic pigments, wherein the magnetic pigments of the at least one opaque magnetic printing ink and the magnetic pigments of the at least one further opaque magnetic printing ink differ in terms of colour and/or magnetic properties.

17. The security element according to claim 16, wherein the magnetic pigments of the at least one opaque magnetic printing ink and the magnetic pigments of the at least one further opaque magnetic printing ink differ in terms of magnetic coercivity.

18. The security element according to claim 16, wherein at least two of the at least one opaque magnetic printing ink and the at least one further opaque magnetic printing ink correspond to a same colour and differ in terms of their magnetic properties, or at least two of the at least one opaque magnetic printing ink and the at least one further opaque magnetic printing ink correspond to different colours and do not differ in terms of their magnetic properties.

19. The security element according to claim 16, wherein at least two of the at least one opaque magnetic printing ink and the at least one further opaque magnetic printing ink have been incorporated or applied in different code regions, which are formed as regions that are spaced apart from one another in a top view and/or are arranged so as to overlap one another in a top view.

20. A security element having a machine-readable code and an optically variable security feature, which has a visual appearance that depends on a viewing angle, wherein the machine-readable code is a magnetic encoding, which is produced by printing at least one opaque magnetic printing ink containing magnetic pigments, with the at least one opaque magnetic printing ink being incorporated or applied in at least one defined code region such that the visual appearance of the optically variable security feature is determined at least in part by the at least one incorporated or applied opaque magnetic printing ink, wherein the optically variable security feature comprises a micro-optical micro-lens arrangement, which covers the at least one defined code region in which the at least one opaque magnetic printing ink has been incorporated or applied, wherein the magnetic pigments of the at least one opaque magnetic printing ink comprise a magnetized or magnetizable core, which is surrounded by an opaque dye.

* * * * *